June 21, 1938.  L. P. RAMSDELL  2,121,212
DEMONSTRATING DEVICE
Filed Sept. 6, 1935    3 Sheets-Sheet 1
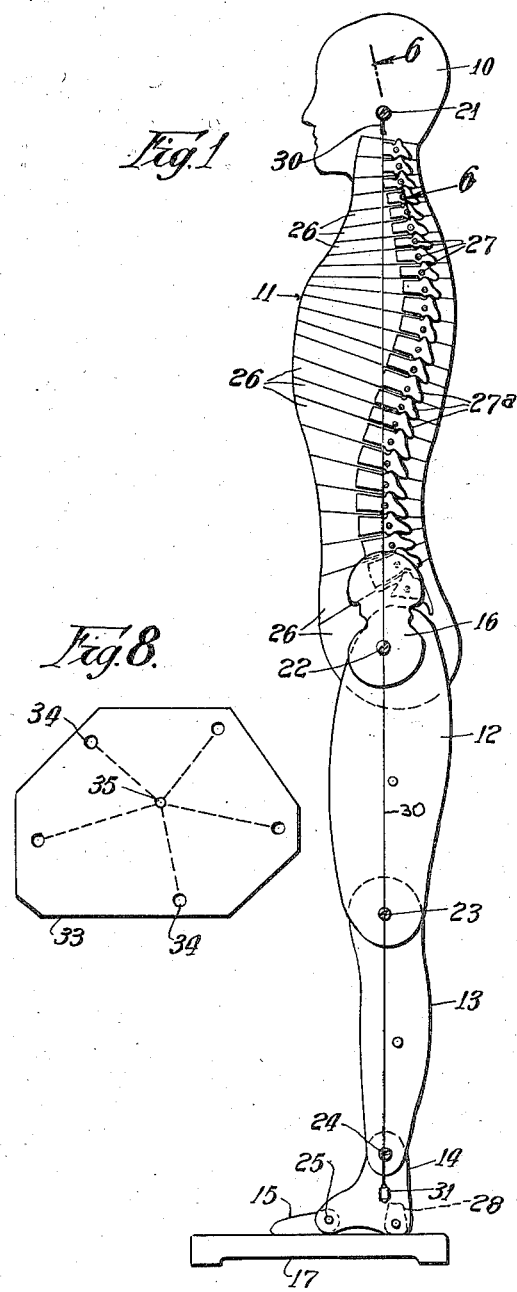
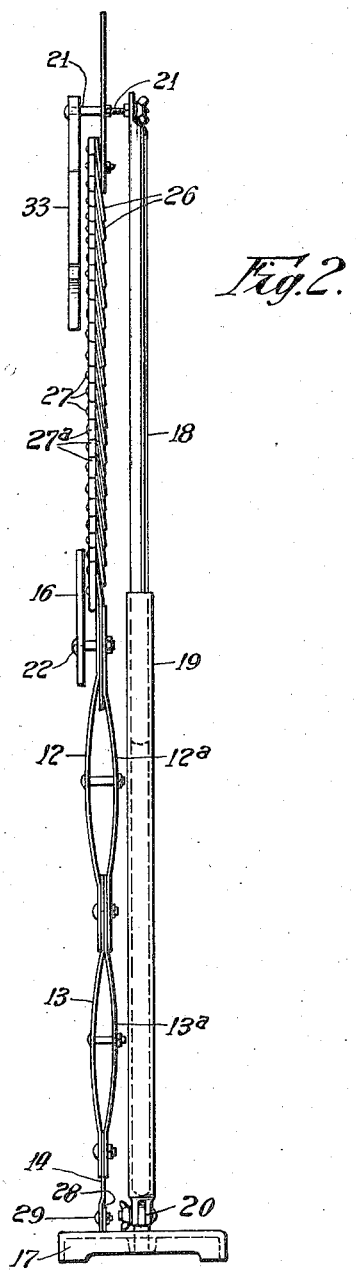
Witness:
Enea Camponini
Inventor:
Leroy Pierce Ramsdell.
By Winfield Williams
Atty.

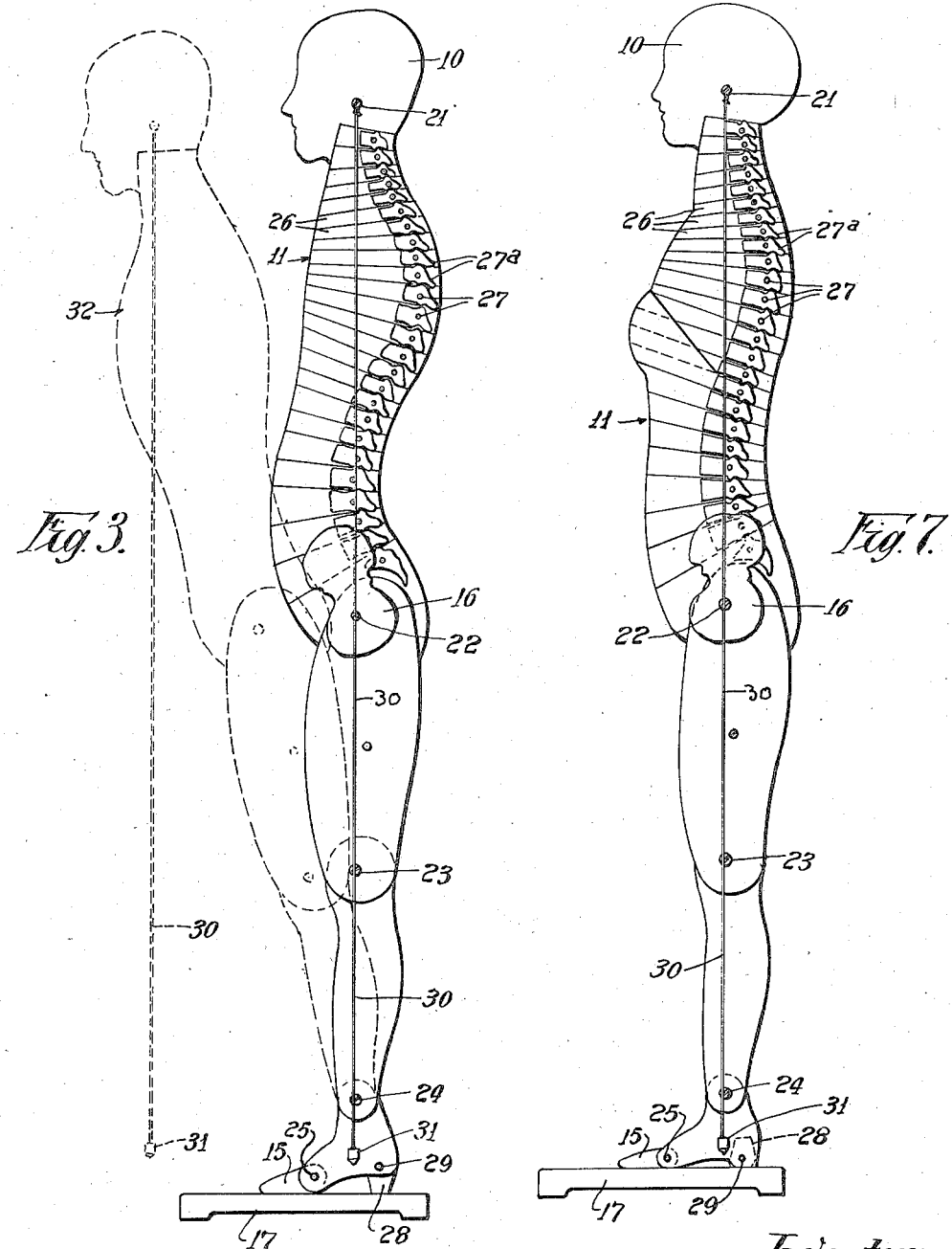

June 21, 1938. L. P. RAMSDELL 2,121,212
DEMONSTRATING DEVICE
Filed Sept. 6, 1935  3 Sheets-Sheet 3
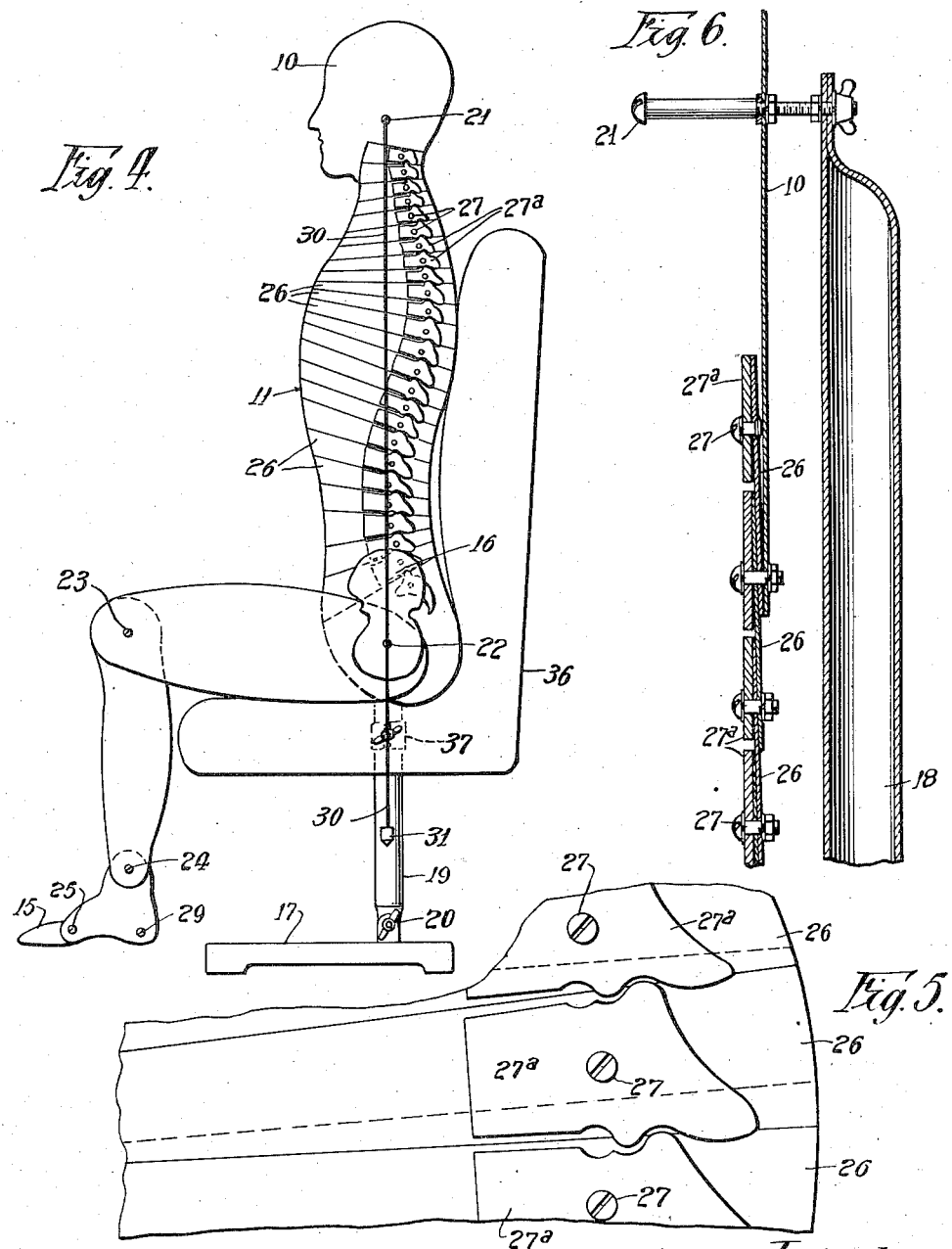

Patented June 21, 1938

2,121,212

UNITED STATES PATENT OFFICE 2,121,212

DEMONSTRATING DEVICE

Leroy Pierce Ramsdell, La Porte, Ind.

Application September 6, 1935, Serial No. 39,422

14 Claims. (Cl. 35—28)

My invention is in the class of devices which are used in educational and demonstrating work appertaining to the use of the human body.

The major object of this device is the explanation and visual demonstration of the resources and economy of the human structure.

The specific uses and applications of this invention are in the fields of certain types of orthopedia, physical culture, school physical and health training.

An embodiment of my device is shown in the accompanying drawings in which

Fig. 1 is a vertical flat view of the device illustrating an erect human form, with its balanced relations.

Fig. 2 is a side view of the device and supporting mechanism.

Fig. 3 is an illustration of the device in Fig. 1 thrown out of balance, with its consequent effects.

Fig. 4 is the device shown in a sitting posture.

Fig. 5 are enlarged vertebrae.

Fig. 6 is a detailed enlargement of a portion of the supporting mechanism, and a portion of the spinal column, shown by arrows 6—6 of Fig. 1.

Fig. 7 illustrates the device in connection with the female figure form.

Fig. 8 illustrates a device used in the demonstration of balance in any of the figures presented.

The human form is fundamentally a mechanism, containing within itself an unmeasurable number of movements, with a flexibility for accomplishing said movements, and it contains within itself all of the resources and economies to conserve and maintain perfect natural functions. Nature has provided a structural formation wholly devised to sustain a balanced condition, and it has provided the means of sustaining this balanced condition when for any reason it is either intentionally moved out of that balanced condition, or is thrust out of that balanced condition by external conditions. When these external conditions, or volitional variations occur, the naturally provided means of restoring skeletal and muscular balance may be supplemented and aided by methods of care and treatment to bring the structure into normally balanced condition. When extraordinary strains tend to limit or impair the normal activity of the restorative process of nature, such supplemental methods of care and treatment are particularly necessary.

In the composition of this structure certain portions of the human body are practically rigid, fixed members, and certain portions are pliant members; the combination of these elements forms the complete structure. The head is a single unit fixed member. The limbs simulating portion of the device comprises two rigid members pivotally related, the foot being formed of two parts pivotally connected for permitting relative movement illustrative of the foot and ankle movements observable in posture-study. If a healthy human body is standing in a normally proper erect position, a plumb line pendant from a point about the position of the ear will fall to a point slightly back of the arch of the foot, and take within its drop the articulating points of the thigh bone, the knee juncture, and the ankle. In this position the body is so perfectly balanced that it will sustain its activity and functions with the least wear or injury. It is thought that the health of the body depends to a large extent upon the maintenance of proper skeletal equilibrium and that proper functioning of the skeletal members as well as other body-organs is affected favorably or unfavorably in proportion to the maintenance of the supporting and sustaining activity of the spinal column. Whatever throws this spinal column and related skeletal members contained within the torso out of adjustment is vital to the entire structure. The understanding of these basic facts and their visual exemplification are the objects of the applicant's device.

As illustrated, 10 suggests a head, 11 a torso, 12 the upper leg structure, 13 the lower leg member, 14 the body of the foot and 15 is designed to suggest the portion of the foot at the bend of the toe portion—in other words the sole of the foot. 16 is a member suggestive of the pelvic portion of the body, and this member is movably mounted on a pinion representing the point of juncture between the torso and the thigh bone. 17 is a standard upon which the device is rotatably mounted at 20 by means of a telescoping pair of tubes 18 and 19, slidably disposed one within the other with sufficient tightness to insure frictional limitation of movement so that the tubes may be manually telescoped to any desired position. The tube 19 is clampwise pivotally mounted at its lower extremity in the wing-nut bracket 20 disposed rigidly on the upper face of the standard or base 17. It will be evident of course that the wing-nut bracket 20 may be readily adjusted to exert any desired amount of frictional limitation against the swingable movement of the tube 19 and its associated tube 18 so that they may be manually shifted to any desired angle of inclination with respect to the base 17, and will remain in such position, thus permitting the image to be swayed forward or backward thus to illustrate the strains upon the bodily structure to recover a perfect pose and activity, as illustrated in Fig. 3. The figure, as a whole, is held pendant from pivotal point 21 at the top of the tubular member 19; and which pivotal point is positioned at the pivotal point of the ear and just above the primary vertebra of the spinal column. 22 is a pivotal point suggestive of the point of articulation between the torso and the thigh bone, and at this point on the same pivot is projected the plate 16 illustrative of the pelvic bones, and is capable of being manipulated on said pivot to show the changed positions in the changing of the strains upon the spinal column, and the relation of the torso to the limb members; 23 is the articulation of the knee; 24 is the articulation of the ankle, and 25 is the point of articulation of the foot. The torso is superficially illustrated by sectional portions movable one upon another as shown in Fig. 5, each one of these movable portions 26 being fixed to a respective single vertebra 27a at an articulation point 27. It should be noted that since each of the vertebra-like members 27 is similar in outline to a vertical cross-section of a human vertebra, each such member will have, along its upper and lower edges respectively, portions analogous to and representing the superior and inferior articular processes of the vertebra. The superior process of each member 27 is substantially engaged with the inferior process of the next super-jacent member in a manner representative of the relationship between corresponding vertebrae in the natural human body. It will be evident that any maladjustment, change, or distortion of one or more vertebrae will produce corresponding and compensating changes of relative position in each successive vertebra along the entire spinal column in a manner truly representative of such relationships in the human body. Since the plate members 26 are each rigidly fixed to a particular vertebra member 27, these also will be relatively readjusted with respect to each other in accordance with movement of the vertebrae members 27. Thus the lecturer or demonstrator may readily, by means of proper manipulations, illustrate such matters with an ease, clarity, and facility hitherto impossible. There is provided a member 28 pivoted at a point 29 on the theoretical heel of the image, for manual movement through an angle of 180° so as to present either the upper or lower edge of the member 28 for impinging contact with the upper face of the standard or base 17 as may be desired by the user in illustrating the effects upon the entire structure of an increase of the elevation of the heel, as shown in Fig. 3 wherein the entire structure is thrown out of balance as at 32. It will thus be evident that the ankle 24 will be thrown over the instep instead of over the heel, and to recover balance the only flexible portion to bear the strain is the spinal column, and that tends to assume a position as in Fig. 3. The sectional pieces can be adjusted to indicate the pressures and strains upon the members within the torso, and it will be observed that in compelling the point 22 to recover its center of gravity the spine is thrown into a curvature somewhat as indicated in Fig. 3, to maintain the center of gravity. In representing the female figure, a flat plate member 26a, having the outline of the female breast may be incorporated with a suitable number of torso-representing plate members 26, as best seen in Figure 7.

The parts composing the head, torso, limbs and foot are plates as shown in Fig. 2: in the said figure the thigh portion of the image is shown as composed of two plates at 12 and 12a for providing structural strength and rigidity, but they may be a single plate; likewise 13 and 13a; without departing from the principles involved. In Fig. 4 there is shown a seat 36, positioned on the tube 19, having means 37 adapted to enable it to be raised or lowered on the tube 19 to illustrate a proper balance of the body in a sitting posture: as well as to show the effects upon the spinal column and the contents of the torso in variations from the normal structure.

It is definitely to be understood that the invention does not claim to be a skeleton, nor a model of a human body. And it is not claimed to be an articulated skeleton: and the various parts are so related that they must be manually manipulated and co-related so that any specific pose is definitely adjusted to retain that position until again manipulated.

I claim:

1. A demonstrating device consisting of a plurality of interrelated and frictionally interengaging sections articulated and shaped in profile to simulate outline anatomical portions of a living creature, suspended pivotally from a point in the head above the upper vertebra of the spinal column mounted and manually movable upon a support, said mounting support pivotally associated with a base, adapting the image to be moved laterally to illustrate the changes in profile outline of the body in relation to changes of the center of gravity.

2. A demonstrating educational device comprising a base; pivotally mounted on said base a supporting means adapted to be extended and have revolving motion upon said base pivot; suspended from a pivotal point at the free end of the mounting an image constructed of a plurality of articulated plates and simulating a profile view of a human body; there being a head-like member articulated upon the upper member of the spinal column; an upper leg-like member articulated upon the torso; a lower leg-like member articulated at a knee juncture; a foot-like member articulated at the ankle joint; the foot portion being articulated at the juncture of the toes with the foot member; the torso being composed of a plurality of overlapping sections, and each of said sections frictionally engaging an adjacent section and being articulated with reference to each other for simulating the mechanical effect upon the profile outline of the torso, of variations in the relative positions of component members of the spinal column.

3. An educational device consisting of an image simulating the human form, adapted to be suspended from a point in the head member substantially near the upper vertebra of the spinal column: there being a head-like member, a leg-like member, a foot-like member, a toe-like member, and individual vertebra-like members representing the spinal column; each individual vertebra-like member having an extension portion adapted to form one section of a plurality of such sectional members adapted to operate in association to form the outlines of a torso; the several members representing the head, the spinal column, the leg, and the foot being articulated at points corresponding to the natural points of articulation, adapted to superficially illustrate by change of profile outline movements of the human body.

4. A demonstrating device of the character described consisting of a series of flat plate members, simulatingly illustrating the human body, consisting of a head-like member, a plurality of vertebra-like members representing the individual members of the spinal column, a leg-like member, and a foot-like member, all of said members being fastened respectively together to form in their assembled entirety a profile representation of the human body, adapted to exemplify as a flat image the operative relation of the elemental supporting structure parts of the human body; the entire combination mounted swingingly from a pivotal point in the head member and adapted to depict the variations in profile outlines of the human body corresponding to the various movements of the structural support of the human body under varying strains and stresses; demountably positioned upon the pivotal joint between the torso and the thigh member a flat member illustrating the profile outline and position of the pelvic bone and adapted to be moved into varying natural positions in harmony with the various positions of the limbs and the spinal column as the same are moved in relation to the center of gravity of the human system; the said image adapted to be swingingly manipulated latterally on the said pivot.

5. In a device for the purposes described an image simulating the structural formation of a human body, a plurality of representations of elementary supporting elements arranged in lateral alignment and each jointed to the next adjacent one; the said image being suspended from a pivotal point projected in the head member; a plumbline and plumb swingingly associated on the pivotal point of the head member and adapted to indicate upon the image the effect upon the contour of the image changing relation of the supporting elements of the said body when any member of the structure is moved out of vertical position with relation to the center of gravity.

6. A demonstrating device comprising a standard with a frictionally restrained pivoted upright having means at the free end thereof to support an image consisting of a multiplicity of members shaped in profile to simulate anatomical portions whereby to illustrate the relation and functioning of each member of the bony structure of the human body articulated to illustrate its movements; a simulation of a chair seat and back slidably mounted upon the pivoted upright adapted to illustrate the positions of the members of the human supporting structure when seated.

7. In a device for the purposes described a base; pivotally mounted for manually swingable adjustment upon said base a telescoping structure having pivotal means adapted to display an image constructed of a plurality of articulated members suggestive of selected segments of the silhouette of the human body; a flat member irregularly formed having a series of holes at variant points near the periphery, a central indicating point, radiating lines from the center to each several hole, the said flat member adapted to be demountably hung on the supporting pivot to indicate the shifting of the center of gravity in various positions of the image.

8. In a device of the character described, a plurality of flat members, each of said members having a shape similar in outline to a vertical elevation of a selected imaginary segment of a human torso, said members being assembled in adjacent relationship to form a vertical elevation of a human torso, a plurality of spinal members, each of said members being similar in outline to a vertical elevation of a selected vertebra in the human spinal column, one of said spinal members being rigidly mounted on each of said flat members, means for articulatingly joining each of the flat members in such a manner that they will move with respect to each other with limited freedom, said means comprising a pin connectingly inserted thru the upper portion of the members and the lower of the next adjacent member, said member being pivotally arranged upon the pin with sufficient tightness to provide frictional limitation of movement.

9. In a device of the character described, a plurality of flat members, each of said members having a shape similar in outline to a vertical elevation of different selected imaginary segments respectively of a human torso, said members being adapted to overlap in such a manner as to form in their entirety a vertical elevation of the human torso, and means for joining the respective flat members together in that overlapping relationship in such a manner as to permit restrained movement of the various segments with respect to each other under the application of an external force, said means comprising a pin connectingly inserted thru the upper portion of the member and the lower portion of the next adjacent member, said members being pivotally arranged upon the pin with sufficient tightness to provide frictional limitation of movement.

10. In a device of the character described, a plurality of flat members, each of said members having a shape similar in outline to a vertical elevation of different selected imaginary segments of a human torso, said members being adapted to overlap in such a manner as to form in their entirety a vertical elevation of the human torso, and means for joining the respective flat members together in that overlapping relationship in such a manner as to permit restrained movement of the various segments with respect to each other under the application of an external force other than gravity, said means comprising a pin connectingly inserted thru the upper portion of the member and the lower portion of the next adjacent member, said members being pivotally arranged upon the pin with sufficient tightness to provide frictional limitation of movement.

11. In a device of the character described, a plurality of flat members, each of said members having a shape similar in outline to a vertical elevation of different selected imaginary segments respectively of a human torso, said members being adapted to overlap in such a manner as to form in their entirety a vertical elevation of the human torso, means for joining the respective flat members together in that overlapping relationship in such a manner as to permit restrained movement of the various segments with respect to each other under the application of an external force, said means comprising a pin connectingly inserted thru the upper portion of the member and the lower portion of the next adjacent member, said members being pivotally arranged upon the pin with sufficient tightness to provide frictional limitation of movement and a plurality of spinal members, each of said members being geometrically similar to a vertical elevation of a different selected vertebra in the human spinal column, one of said spinal members being operatively associated with each of said flat members.

12. In a device of the character described, a plurality of flat members, each of said members having a shape similar in outline to a vertical elevation of different selected imaginary segments respectively of a human torso, said members having adapted to overlap in such a manner as to form in their entirety a vertical elevation of the human torso, means for joining the respective flat members together in that overlapping relationship in such a manner as to permit restrained movement of the various segments with respect to each other under the application of an external force, said means comprising a pin connectingly inserted thru the upper portion of the member and the lower portion of the next adjacent member, said members being pivotally arranged upon the pin with sufficient tightness to provide frictional limitation of movement, and a plurality of spinal members, each of said members being geometrically similar to a vertical elevation of a different selected vertebra in the human spinal column, one of said spinal members being operatively associated with each of said flat members and two other spinal members.

13. In a device of the character described, a plurality of flat members, each of said members having a shape similar in outline to a vertical elevation of different imaginary selected segments respectively of a human torso, said members being adapted to overlap in such a manner as to form in their entirety a vertical elevation of the human torso, means for joining the respective flat members together in that overlapping relationship in such a manner as to permit restrained movement of the various segments with respect to each other under the influence of manually applied force, said means comprising a pin connectingly inserted thru the upper portion of the member and the lower portion of the next adjacent member, said members being pivotally arranged upon the pin with sufficient tightness to provide frictional limitation of movement and a plurality of spinal members, each of said members being geometrically similar to a vertical elevation of a different selected vertebra in the human spinal column, one of said spinal members being operatively associated with each of said flat members and two other spinal members.

14. In a device of the character described a substantially side-view presentation of the human body consisting of a series of partially overlapping plates, which, in their assembled entirety, form a silhouette-like representation of the human torso, each of said plates being pivotally joined to another of the plates by means of a pin inserted therethru with sufficient tightness to permit frictional restrained pivotal movement of the plates with respect to each other, a plurality of flat elements having a shape corresponding to the profile of vertebrae, each of said vertebra-like elements being rigidly mounted on and movable with a corresponding one of said overlapping plates, each of said vertebra-like elements being arranged for engagement with the vertebra-like element on the next adjacent plate, whereby the last named vertebra-like element will be moved responsive to movement of the first named vertebra-like element articulated and axially manipulatable in relation to each other for producing changes in the relative relationship of the various component members of the torso-representation responsive to external forces, correspondingly illustrative of changes in the human torso upon application of such forces, leg and foot members, said members being respectively articulated at points indicative of their relation to each other and to the structure as an entirety, and means to support the structure.

LEROY PIERCE RAMSDELL.